United States Patent Office 2,793,978
Patented May 28, 1957

2,793,978

ION EXCHANGE PURIFICATION OF NEOMYCIN

Jacques L. Wachtel, Plainfield, and Wilbur L. Bryan, Belle Mead, N. J., assignors to Olin Mathieson Chemical Corporation, New York, N. Y., a corporation of Virginia No Drawing. Application June 27, 1955, Serial No. 518,338

15 Claims. (Cl. 167—65)

This invention relates to the recovery and/or purification of nitrogen basic antibiotics (hereinafter referred to for brevity as "basic antibotics"); more specifically, it is concerned with the separation of a basic antibiotic produced by a fermentation process from the whole broth or acid filtrate thereof.

Although the invention will be described with particular reference to the recovery of neomycin, and streptomycin it is equally operative in the recovery of other basic antibiotics, such as streptothricin, or other antibiotically-active basic compounds, which (like neomycin and streptomycin) are capable of being adsorbed on a particulate cation exchanger. By the term "whole broth" is meant a fermentation broth which has not beeen subjected to a treatment for the separation of any component thereof, either solid or liquid. By the term "acid filtrate" is meant the liquid and soluble components of a whole broth which have been separated therefrom by acidification and filtration. By the term "particulate cation exchanger" is meant a material in relatively small particle form which has the ability to adsorb and/or exchange cations.

Prior to this invention, various methods were employed for separating basic antibiotics from genetic contaminants such as unreacted nutrient media, mycelium, spores, and various other impurities. The most commonly used of these was a process employing a cation exchanger. That process involved the steps of: (1) acidifying the whole broth, so as to permit filtration; (2) filtering the acidified mixture, usually with the addition of a filter aid, to remove the culture solids; (3) neutralizing the filtrate (i. e. culture liquid) so as to prepare it for adsorption on a cation exchange material; (4) removing the basic antibiotic from the neutralized filtrate by adsorption on a cation exchange material in its basic (i. e. sodium salt) cycle; (5) eluting the antibiotic from the cation exchange material by means of an acid; and (6) recovering the basic antibiotic from the eluate. More recently, it has been found that under special conditions the whole broth could be directly contacted with a cation exchange material in its basic cycle to remove the basic antibiotic directly therefrom. In order to practice these processes, however, the cation exchange material had to be converted to its salt form (basic cycle) by treatment with an inorganic water-soluble base such as ammonia, an alkali (e. g. sodium hydroxide or potassium hydroxide) or an alkaline earth (e. g. barium hydroxide). When a thus-generated cation exchanger was contacted with a basic antibiotic in whole broth or acid filtrate, some, but not all, of the alkali metal or alkaline earth metal cation was replaced by the basic antibiotic and removed in the effluent. Hence, upon elution of the antibiotic-loaded exchange with an acid, the eluate contained a mixture of the basic antibiotic cation and the residual alkali metal or alkaline earth metal cation. In order to obtain a satisfactory antibiotic preparation, it was then necessary to remove the inorganic impurities (ash). One method commonly used for such removal was the contacting of the ash-laden eluate with an ion exchange monobed [such as a mixture of a nuclear sulfonic cation exchanger (e. g. IR-120) and an anion exchanger (e. g. IR-42)] in order to preferentially exchange the inorganic impurities thereon. This method was not particularly effective, however, since relatively large quantities of the basic antibiotic were also adsorbed on the monobed, with a resultant decrease in recoverable yield of antibiotic, this defect being particularly apparent when the basic antibiotic was neomycin.

An object of this invention, therefore, is to simplify the method of recovering neomycin, streptomycin and other basic antibiotics from whole broths or acid filtrates containing same.

Another object of this invention is the provision of an improved process for recovering neomycin, streptomycin and other basic antibiotics by means of particulate cation exchangers.

Still another object of this invention is the provision of a process for recovering ash-free neomycin, streptomycin, and other basic antibiotics preparations.

These objects are accomplished by the process of this invention which essentially comprises contacting a basic antibiotic (e. g. neomycin and streptomycin) containing composition with a particulate cation exchanger in its amine salt form, separating the antibiotic-stripped effluent from the particles of exchanger, and eluting the basic antibiotic (e. g. neomycin and streptomycin) from the exchanger. By the practice of the process of this invention, the basic antibiotic is obtained relatively free of inorganic salt impurities (ash), since no foreign inorganic cations are introduced during the generation of the cation exchanger. Any organic base (amine) strong enough to react with the hydrogen form of the exchanger is utilizable in generating the cation exchangers for the purposes of this invention. Examples of such organic bases include the primary, secondary, and tertiary aliphatic amines, particularly the lower alkyl amines such as methylamine, dimethylamine, trimethylamine, ethylamine, diethylamine, triethylamine, propylamine, isopropylamine, butylamine, and 2-ethyl-hexylamine; the primary, secondary and tertiary cycloaliphatic amines, particularly the cycloalkylamines, such as cyclobutylamine, cyclopentylamine, and cyclohexylamine; the primary, secondary, and tertiary araliphatic amines, particularly the aralkylamines, such as benzylamine and phenethylamine; and the heterocyclic amines such as the saturated N-heterocyclics (e. g. piperidine, pyrrolidine, morpholine, and their alkyl substituted derivatives). The preferred amines, however, are those which form a salt with the eluting acid which has a distinguishably different solubility than does the salt of the basic antibiotic and the eluting acid. In this regard, it should be noted that ammonia is inoperative in the process of this invention, since upon elution it cannot be readily separated from the basic antibiotic in accordance with the preferred recovery and isolation process more fully detailed hereinafter.

Suitable cation exchangers for use in the process of this invention include those cation exchangers (particularly a weak acid cation exchanger, and especially one which is a resin deriving its exchange capacity essentially from carboxylic groups) priorly used for the adsorption of neomycin, streptomycin, and other basic antibiotics. Examples of such resins are those described in U. S. Patents Nos. 2,319,359, 2,333,754, 2,340,110, and 2,340,111. These resins are sold under various trademark designations, inter alia, as: Alkalex; Amberlite IRC–50; Duolite CS 100; Permutit H–70; and Wofatit C. Especially preferred is the resin sold under the trademark Amberlite IRC–50 (a granular copolymer of methacrylic acid and divinylbenzene).

Preparatory to their use in the process of this invention, a cation exchanger is converted to its basic cycle (salt form) by treatment with an organic base. Although the organic base alone may be used (if the amine is a liquid), the conversion of the exchanger to its amine salt form is preferably accomplished by contacting the exchanger with the amine in an aqueous solution. In order to do this, the amine is dissolved in an aqueous solvent, which may be water alone if the amine is soluble therein, but preferably is a mixture of water and a substantially water-miscible organic solvent wherein the amine is soluble. Although any organic solvent fulfilling the above requirements is utilizable, the preferred water-miscible organic solvents include the lower alkanols of less than four carbon atoms (e. g. propanol, isopropanol, ethanol, and particularly methanol), since the use of a lower alkanol in conjunction with water serves the dual purpose of (1) solubilizing the amine and (2) preventing the breakdown or swelling of the cation exchanger which often occurs when a liquid amine is used alone. The methods of generating the exchanger are the usual ones known in the art and may be accomplished, when an ion exchange column is employed, simply by passing the amine (preferably as an aqueous solution) either upflow or downflow through the exchanger bed. The exchanger in its amine salt form is then ready for adsorption of the antibiotic from fermentation whole broth or acid filtrate.

The adsorption step in the process of this invention can be carried out either batchwise or continuously, using one or more cation exchange columns, tanks or other vessels. Cation exchange columns are preferred, however, because of their ease of operation and compactness. If a plurality of columns are used, they are connected in series so that the effluent from the first column becomes the feed of the second in the usual setup. Each column is then processed until it is saturated with the antibiotic. The column is then by-passed, washed with water (preferably deionized water), eluted with an acid, such as sulfuric acid, to desorb the antibiotic from the cation exchanger as the salt of the eluting acid. The column is then regenerated with one of the amines mentioned hereinbefore. The regenerated column may then be re-inserted into the series of columns as the last member thereof thus permitting a continuous process.

Although either a whole broth or acid filtrate may be used, the preferred process is one wherein the antibiotic (e. g. neomycin and streptomycin) is first freed from mycelium, excess solid nutrient material, and other sedimentary impurities by acidification and filtration; and the acid filtrate thus formed, after further treatment and neutralization, is contacted with the exchanger. To obtain the acid filtrate, the whole broth is acidified to a pH of about 1.5 to about 3.0 by treatment with an acid, such as a mineral acid (e. g. sulfuric acid or hydrochloric acid) and filtered in the usual manner. The filtrate is then adjusted to a pH of about 5.0 to about 9.5 (preferably about 7.0 to about 8.5) with an amine, such as one of the amines hereinbefore described, and the alkalinized acid filtrate (preferably at about 15° C. to 35° C., optimally at about 25° C.) is contacted with the cation exchanger in its amine salt form.

Before contacting the thus-treated acid filtrate with the cation exchanger, any alkaline earth cations (e. g. calcium and magnesium) introduced into the filtrate through the fermentation medium can be sequestered by treating the filtrate with a chelating agent, inter alia, an alpha amino acid, such as ethylenediamine tetraacetic acid, N-hydroxyethylenediamine tetraacetic acid, triglycine (the triacetic acid substitution product of ammonia), glycine, sarcosine, and polymers of (ethylenediamino) diacetic acid (U. S. Patent 2,564,092); or any other type of chelating agent for sequestering calcium and magnesium may be employed. Ethylenediamine tetraacetic acid has been found to be especially effective in the process and is preferred. The chelating agent is introduced either into the acid filtrate in its free acid form and then converted to a soluble amine salt by the amine used to adjust the pH of the filtrate, or is added directly in to the thus-neutralized acid filtrate in the form of a soluble amine salt.

The neutralized acid filtrate is then contacted with the cation exchanger (in its amine salt form). If an ion exchange column is used, this is done by passing the neutralized acid filtrate (optionally containing a sequestering agent) either upflow or downflow through one or a series of columns until the column is substantially saturated with basic antibiotic. The column is then washed in the usual manner with deionized water and eluted with a dilute acid.

The elution is accomplished preferably by treating the loaded exchanger with a dilute mineral acid, such as hydrochloric acid, nitric acid, and optimally sulfuric acid, at a pH in the range of about 1.5 to about 4.5 (preferably about 1.8 to 3.0). A particularly advantageous modification of the elution step resides in a step-wise elution, wherein the exchanger is first contacted with a small quantity of aqueous acid at a pH of about 4.5 to about 6.0 to remove any alkali metal (e. g' sodium) or alkaline earth metals (e. g. calcium) introduced through the fermentation medium and adsorbed on the exchanger, and then with a sufficient quantity of aqueous acid at a pH of about 1.5 to about 4.0 to elute the basic antibiotic adsorbed on the exchanger. The entire elution can, however, be carried out at a constant pH of about 1.5 to about 4.5, but the resulting eluate will contain about twice as much inorganic cation impurity.

Since the eluate is usually excessively acidic and contains free eluting acid, the pH of the eluate is preferably now adjusted to within the range of about 5.0 to about 7.0 by neutralization, as with a weak base anion exchanger, such as IR–4B (a weak base, phenol formaldehyde type anion exchange resin). According to the preferred isolation procedure of this invention, the thus neutralized eluate is then treated, with or without prior concentration, with a substantially water-miscible organic solvent, wherein the salt of the basic antibiotic (e. g. neomycin) and the eluting acid is insoluble but the salt of the eluting acid with the amine used to generate the exchanger and/or neutralize the acid filtrate is soluble. Suitable organic solvents fulfilling the above conditions are the substantially water-miscible alcohols, such as the aliphatic alcohols (e. g. the lower alkanols as exemplified by methanol, ethanol, propanol, and isopropanol); the water-miscible ketones, such as the aliphatic ketones (e. g. acetone); the water-miscible ethers, such as the cyclic ethers (e. g. dioxane); the water-miscible nitriles, such as the alkane-nitriles (e. g. acetonitrile); and the water-miscible amides, such as the aliphatic amides (e. g. dimethyl formamide, diethyl formamide, and ethyl acetamide).

To cause the precipitation of the basic antibiotic salt, the eluate (preferably after neutralization) is treated with an excess of one of the organic solvents hereinbefore listed, and the precipitated basic antibiotic salt is removed as by filtration or centrifugation. The salt may then be vacuum or freeze dried or further purified in the manner known in the art, or it may be converted to its free base from in the conventional manner.

The following examples illustrate the invention:

EXAMPLE 1

*Purification of neomycin*

7 liters of a neomycin whole broth is acidified to a pH of 2.4 with 35 ml. of 95% sulfuric acid and filtered with the aid of 100 g. of Hyflo to give 6.23 l. of acid filtrate having an activity of about 1320 γ/ml. To this filtrate is added 100 g. of ethylenediamine tetraacetic acid. The pH of the filtrate is adjusted to 7.5 by dropwise addition of 180 ml. of diethylamine. 30 cc. of IRC–50 cation exchange resin in its hydrogen cycle, in a one inch glass column, is generated downflow with 80 ml. of triethylamine previously diluted with 1200 ml. of a 50% methanol-water solution. The column is then washed with distilled water and 6 liters of the neutral neomycin filtrate is fed downflow through the column at the rate of 9 ml./minute. After the adsorption is completed, the column is washed with distilled water, and then eluted. This elution is done by first treating the column at a pH of 6 with 6 ml. of 10% sulfuric acid (7 hours' recycling), followed by a main elution at pH 2 with 35 ml. of 10% sulfuric acid (1 hour's recycling). The main eluate is adjusted to pH 7 with IR–4B(OH), giving a total volume of 400 ml. of eluate. This eluate is treated with two 2 g. portions of Dacro G–60, and the neomycin sulfate is precipitated by dropwise addition of the eluate to four volumes of anhydrous methanol. The resulting solid is filtered and vacuum dried for 16 hours at 40° C. to yield a solid residue of neomycin sulfate having an activity of about 461 γ/mg. and containing as impurities about 0.4% methanol and about 0.53% sulfated ash.

EXAMPLE 2

Purification of neomycin 1.65 liters of a neomycin whole broth is acidified to pH 2.3 with 6 ml. of 95% sulfuric acid and filtered with the aid of 70 g. of Dicalite to give 1.25 liters of acid filtrate having an activity of about 1,000 γ/ml. To this filtrate is added 40 g. of ethylenediamine tetraacetic acid. The pH of the filtrate is adjusted to 7.5 by dropwise addition of 78 ml. of triethylamine. 10 cc. of IRC–50 cation exchange resin in its hydrogen cycle, in a ¾ inch glass column, is generated downflow with 70 ml. of 5% triethylamine (w./v.) in 50% methanol-water. The column is then washed with distilled water, and 1.28 liters of the netural neomycin filtrate is fed downflow through the column at the rate of 3 ml./minute. After the adsorption is completed, the resin is transferred from the column to a beaker, washed thoroughly with distilled water, covered with a minimum amount of distilled water and eluted. This elution is carried out by first treating the resin with 3 ml. of 10% sulfuric acid and agitating until the system reaches a pH of 6 (approximately seven hours' agitation). After filtering off the precut and washing the resin with distilled water, the main elution at pH 2 is made in the same manner with 11 ml. of 10% sulfuric acid (approximately one hour agitation). The main eluate is adjusted to a pH of 7 with IR–4B(OH) giving a total volume of 108 ml. of eluate. This eluate is treated with 1.0 g. of Darco G–60 and the neomycin sulfate is then precipitated by dropwise addition into four volumes of anhydrous methanol. The resulting solid is filtered and vacuum dried for sixteen hours at 50° C. to yield a solid residue of neomycin sulfate having an activity of about 646 γ/mg. (dry ash free basis) and containing as impurities about 0.17% sulfated ash and about 9.6% moisture. The rotation of a 1% solution at 20° C. is approximately +53.1°.

EXAMPLE 3

2.0 liters of a neomycin whole broth, pH 7.5, is treated with 1.0 liter of a 5% N-hydroxyethylene-diamine tetraacetic acid previously adjusted to pH 7.5 with 75 ml. of butylamine to give a treated whole broth of 3.1 liters having an activity of about 1000 γ/ml. 10 cc. of IRC–50 cation exchange resin in its hydrogen cycle, in a ¾ inch glass column, is generated downflow with 50 ml. of 5% butylamine (w./v.) in 50% methanol-water. The column is then washed with distilled water and the treated whole broth is fed upflow through the column at a rate of 3 ml./minute. After the adsorption is completed, the resin is thoroughly washed upflow with distilled water, transferred to a beaker, covered with a minimum amount of distilled water, and eluted. This elution is carried out by first treating the resin with 4 ml. of 10% sulfuric acid and agitating until the system reaches a pH of 6 (approximately seven hours' agitation). After filtering off the precut and washing the resin with distilled water, the main elution at pH 2 is made in the same manner with 12 ml. of 10% sulfuric acid (approximately one hour agitation). The main eluate is adjusted to a pH of 7 with IR–4B(OH) giving a total volume of 130 ml. of eluate. This eluate is treated with 1.0 g. of Darco G–60 and the neomycin sulfate is then precipitated by dropwise addition into five volumes of anhydrous ethanol. The resulting solid is filtered and vacuum dried for sixteen hours at 50° C. to yield a solid residue of neomycin sulfate having an activity of about 650 γ/mg. (dry ash free basis) and containing as impurities about 0.4% sulfated ash and about 9.9% moisture.

EXAMPLE 4

Purification of streptomycin 5.0 liters of a streptomycin whole broth, having an activity of about 2,500 u./ml., is diluted with 2.5 liters of water, acidified to pH 2.5 with 10 ml. of 95% sulfuric acid, and filtered with the aid of 200 g. of Dicalite, giving an acid filtrate having an activity of about 1550 u./ml. To this filtrate is added 20 g. of ethylenediamine tetraacetic acid. The pH of the filtrate is adjusted to 7.5 by dropwise addition of 150 ml. of triethylamine. 40 cc. of IRC–50 cation exchange resin in its hydrogen cycle, in a ¾ inch glass column, is generated downflow with 280 ml. of 5% triethylamine (w./v.) in 50% methanol-water. The column is then washed with distilled water, and 7.3 liters of the neutral streptomycin filtrate is fed downflow through the column at a rate of 12 ml./minute. After the adsorption is completed, the resin is transferred from the column to a beaker, washed thoroughly with distilled water, covered with a minimum amount of distilled water, and eluted. This elution is carried out by first treating the resin with 15 ml. of 10% sulfuric acid and agitating until the system reaches a pH of 6 (approximately seven hours' agitation). After filtering off the precut and washing the resin with distilled water, the main elution at pH 2 is made in the same manner with 50 ml. of 10% sulfuric acid (approximately one hour's agitation). The main eluate is adjusted to a pH of 7 with IR–4B(OH) giving a total volume of 400 ml. of eluate. This eluate is twice treated with 2.0 g. of Darco G–60 and the streptomycin sulfate is then precipitated by dropwise addition into four volumes of anhydrous methanol. The resulting solid is filtered and vacuum dried for sixteen hours at 50° C. to yield a solid residue of streptomycin sulfate having an activity of about 780 u./mg. (dry, ash free basis) and containing as impurities about 0.6% sulfated ash and about 4.5% moisture.

The invention may be otherwise embodied within the scope of the appended claims.

We claim:

1. The process of recovering neomycin from a whole broth wherein it has been produced, which comprises acidifying and filtering the whole broth, recovering the acid filtrate, adding a sequestering agent to the acid filtrate, at least partially neutralizing the acid filtrate with an amine, contacting the thus-treated acid filtrate with a cation exchange resin, which derives its exchange capacity essentially from carboxylic groups and is in its amine salt form, the amine being selected from the group consisting of alkyl amines, cycloalkyl amines, aralkyl amines, and unsubstituted and alkyl-substituted piperidine, pyrrolidine and morpholine, separating the neomycin-stripped effluent from the resin, contacting the exchange resin with a small quantity of a dilute mineral acid at a pH in the range of about 4.5 to about 6.0, contacting the exchange resin with a sufficient quantity of dilute mineral acid at a pH in the range of about 1.5 to about 4.5 to elute all the neomycin and any amine present on the resin, mixing the thus-produced eluate with a substantially water-miscible polar organic solvent wherein the neomycin salt of the mineral acid is insoluble and any amine salt of the mineral acid present is soluble, and recovering the precipitated neomycin salt.

2. The process of claim 1 wherein the mineral acid is sulfuric acid.

3. The process of claim 2 wherein the organic solvent is a lower alkanol.

4. The process of claim 1 wherein the cation exchange resin is converted to its amine salt form prior to the introduction of the acid filtrate by contacting the cation exchanger resin in its free acid form with an aqueous-alcoholic solution of the amine.

5. The process of recovering neomycin from a whole broth wherein it has been produced, which comprises acidifying and filtering the whole broth, recovering the acid filtrate, at least partially neutralizing the acid filtrate with an amine, contacting the thus-treated acid filtrate with a cation exchange resin, which derives its exchange capacity essentially from carboxylic groups and is in its amine salt form, the amine being selected from the group consisting of alkyl amines, cycloalkyl amines, aralkyl amines, and unsubstituted and alkyl-substituted piperidine, pyrrolidine and morpholine, separating the neomycin-stripped effluent from the resin, contacting the exchange resin with a sufficient quantity of dilute mineral acid at a pH in the range of about 1.5 to about 4.5 to elute all the neomycin and any amine present on the resin, mixing the thus-produced eluate with a substantially water-miscible polar organic solvent wherein the neomycin salt of the mineral acid is insoluble and any amine salt of the mineral acid present is soluble, and recovering the precipitated neomycin salt.

6. The process of claim 5, wherein the mineral acid is sulfuric acid.

7. The process of claim 6, wherein the organic solvent is a lower alkanol.

8. The process of claim 5, wherein the cation exchange resin is converted to its amine salt form prior to the introduction of the acid filtrate by contacting the cation exchanger resin in its free acid form with an aqueous-alcoholic solution of the amine.

9. The process of claim 5, wherein the acid filtrate is neutralized to a pH of at least 7 prior to being contacted with a cation exchange resin.

10. The process of separating fermentation-produced neomycin from a mixture thereof with genetic contaminants, which comprises contacting the mixture with a cation exchange resin, which derives its exchange capacity essentially from carboxylic groups and is in its amine salt form, the amine being selected from the group consisting of alkyl amines, cycloalkyl amines, aralkyl amines, and unsubstituted and alkyl substituted piperidine, pyrrolidine and morpholine, separating the neomycin-stripped effluent from the resin, contacting the resin with a sufficient quantity of dilute mineral acid at a pH in the range of about 1.5 to about 4.5 to elute all the neomycin and any amine present on the resin, mixing the thus-produced eluate with a substantially water-miscible polar organic solvent wherein the neomycin salt of the mineral acid is insoluble and any amine salt of the mineral acid present is soluble, and recovering the precipitated neomycin salt.

11. The process of claim 10, wherein the amine is a lower alkyl amine.

12. The process of claim 10, wherein the mineral acid is sulfuric acid.

13. The process of claim 12, wherein the organic solvent is a lower alkanol.

14. The process of claim 10, wherein the cation exchange resin is converted to its amine salt form prior to the introduction of the neomycin-containing mixture by contacting the resin in its free acid form with an aqueous-alcoholic solution of the amine.

15. The process of recovering neomycin from a whole broth wherein it has been produced, which comprises contacting the whole broth with a cation exchange resin which derives its exchange capacity essentially from carboxylic groups and is in its amine salt form, the amine being selected from the group consisting of alkyl amines, cycloalkyl amines, aralkyl amines, and unsubstituted and alkyl-substituted piperidine, pyrrolidine and morpholine, separating the neomycin-stripped effluent from the resin, contacting the resin with a sufficient quantity of dilute mineral acid at a pH in the range of about 1.5 to about 4.5 to elute all the neomycin and any amine present on the resin, mixing the thus-produced eluate with a substantially water-miscible polar organic solvent wherein the neomycin salt of the mineral acid is insoluble and any amine salt of the mineral acid present is soluble, and recovering the precipitated neomycin salt.

References Cited in the file of this patent

UNITED STATES PATENTS

| | | |
|---|---|---|
| 2,541,420 | Howe | Feb. 13, 1951 |
| 2,560,891 | Regna | July 17, 1951 |
| 2,628,186 | Shive | Feb. 10, 1953 |
| 2,653,151 | Sokal | Sept. 22, 1953 |
| 2,656,347 | Goett | Oct. 20, 1953 |
| 2,658,078 | Blase | Nov. 3, 1953 |
| 2,667,441 | Nager | Jan. 26, 1954 |